United States Patent [19]
Zaveri et al.

[11] Patent Number: 4,634,180
[45] Date of Patent: Jan. 6, 1987

[54] VEHICLE EASY ENTRY SEAT LATCHING MECHANISM

[75] Inventors: Vikram Zaveri, Springfield; Dennis H. Heling, Canton; Keith S. Radyko, Roseville, all of Mich.

[73] Assignees: Keiper Recaro Incorporated, Battle Creek; Chrysler Motors Corporation, Highland Park, both of Mich.

[21] Appl. No.: 794,452

[22] Filed: Nov. 4, 1985

Related U.S. Application Data

[63] Continuation-in-part of Ser. No. 638,311, Aug. 6, 1984.

[51] Int. Cl.4 ............................................. A47C 1/02
[52] U.S. Cl. .................................. 297/341; 248/430; 297/379; 297/367
[58] Field of Search ............... 297/341, 379, 329, 363, 297/367; 248/430

[56] References Cited
U.S. PATENT DOCUMENTS

| 4,223,946 | 9/1980 | Kluting | 297/363 |
| 4,366,984 | 1/1983 | Klevting et al. | 297/379 |
| 4,440,442 | 3/1984 | Drouillard et al. | 248/430 X |
| 4,484,779 | 11/1984 | Suzuki | 297/379 X |
| 4,497,518 | 2/1985 | Nishimura et al. | 297/341 |
| 4,530,540 | 7/1985 | Hayden et al. | 248/430 X |

Primary Examiner—James T. McCall
Attorney, Agent, or Firm—Lloyd M. Forster

[57] ABSTRACT

Passenger car individual front passenger seat back actuated seat latch release means comprising pivotally connected seat and seat back bracket means, longitudinal track seat adjustment means including manual latch release means, pivoted lever means on the seat bracket means, striker means fixed on the seat back bracket means responsive to forward tilting for actuating the lever means, linkage means from the lever means for actuating said manual latch release means, the striker means including a surface for retaining the lever means in latch release mode during manual return of the seat to rearward position and seat back to upright position.

13 Claims, 16 Drawing Figures

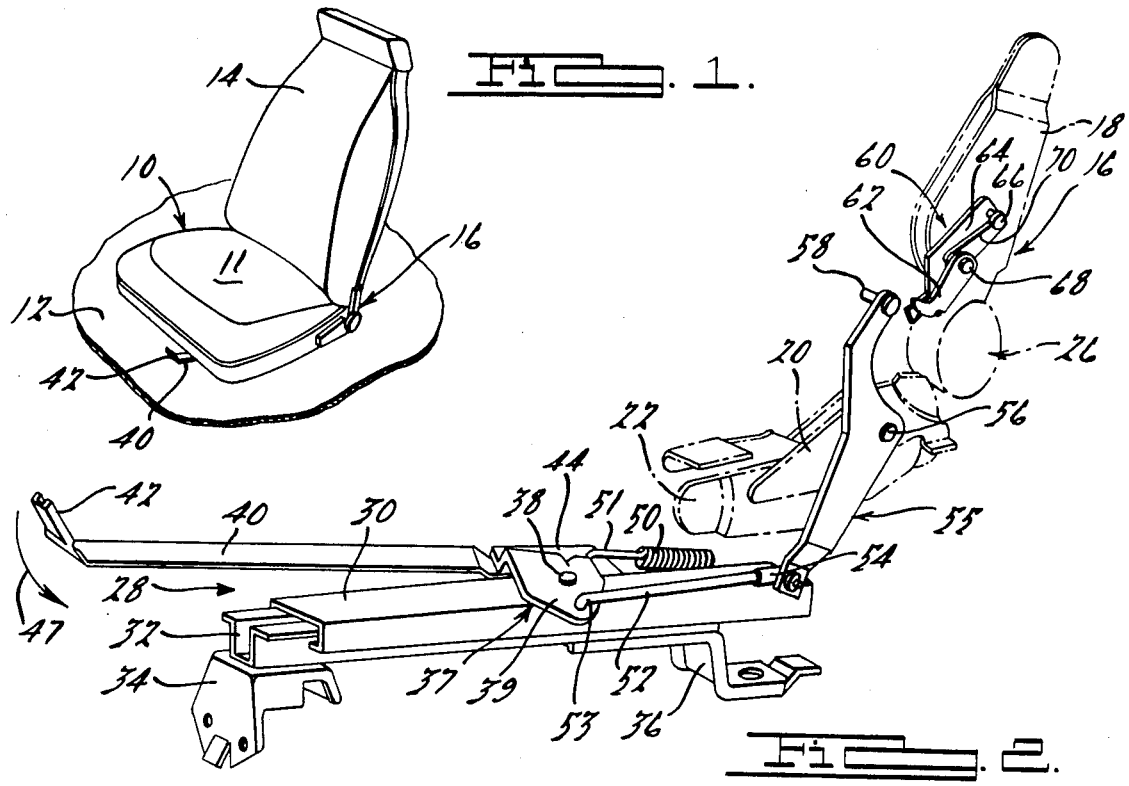
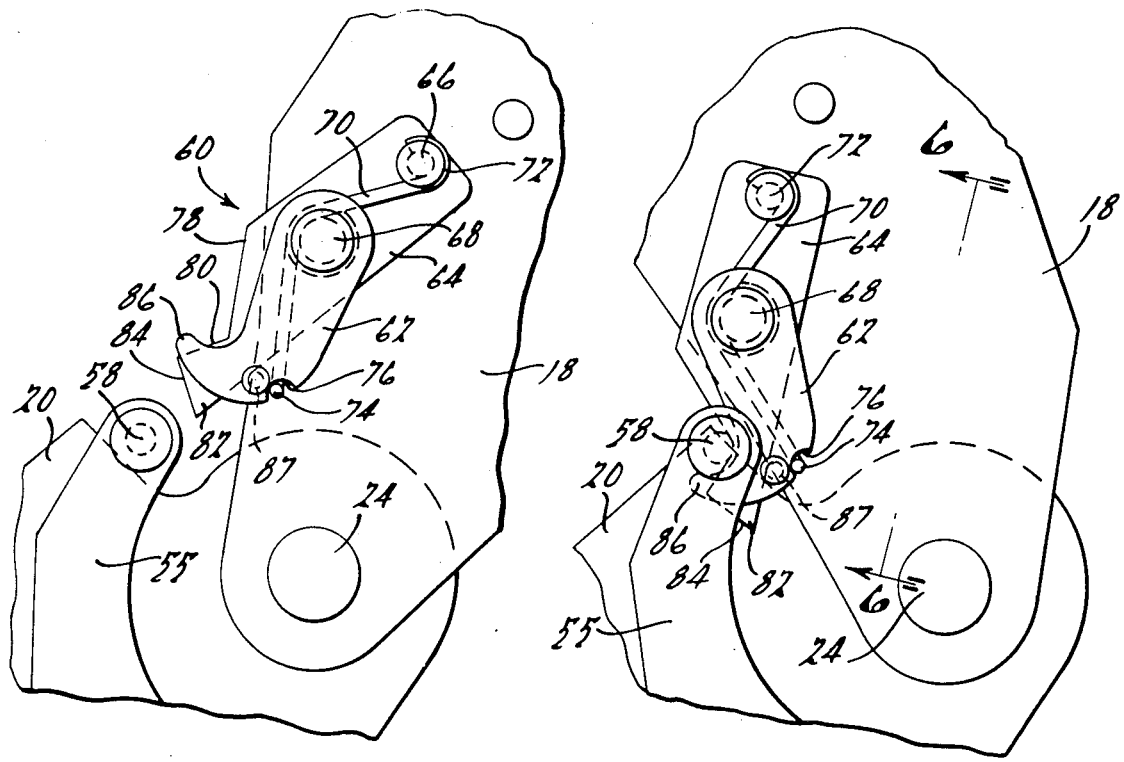

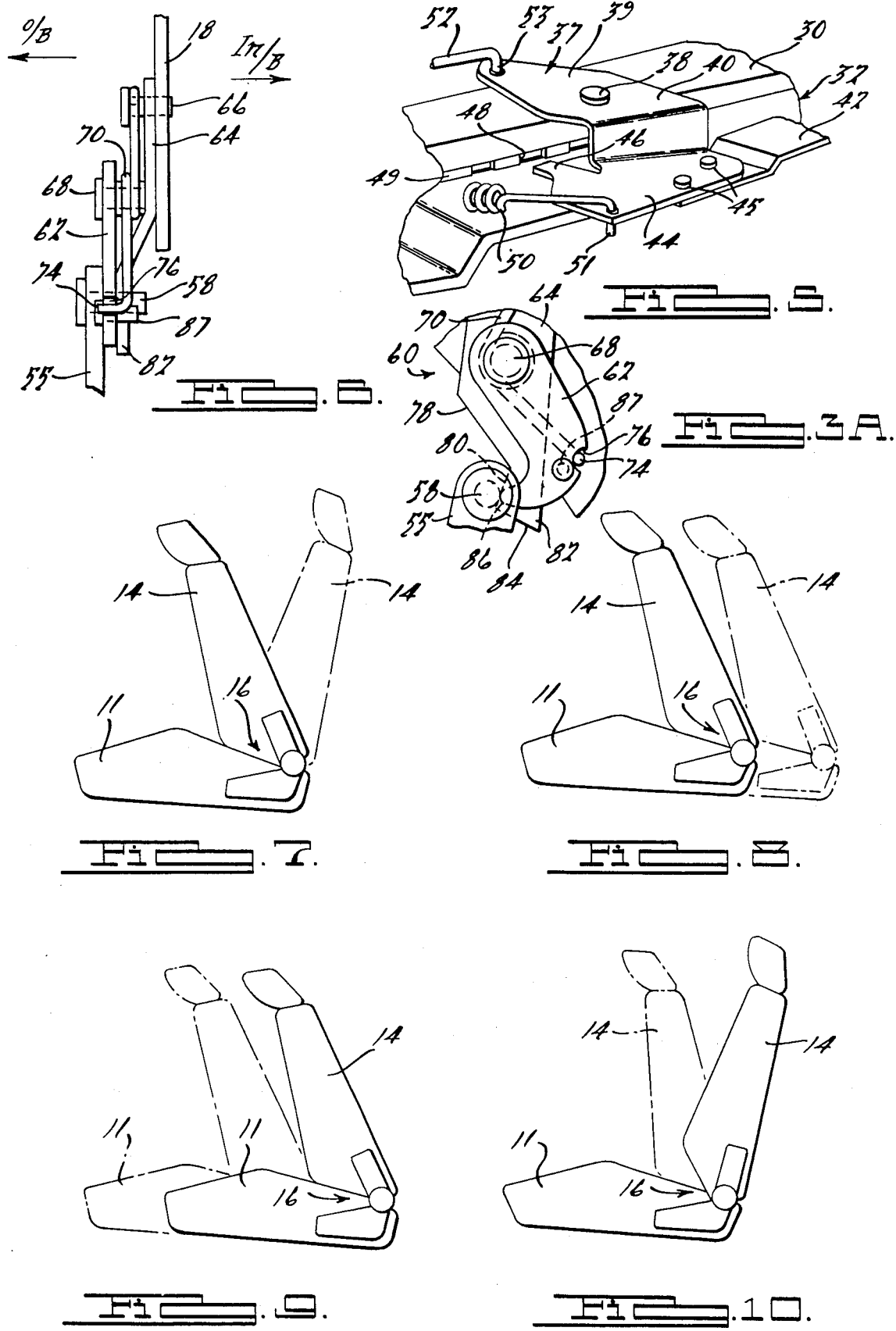

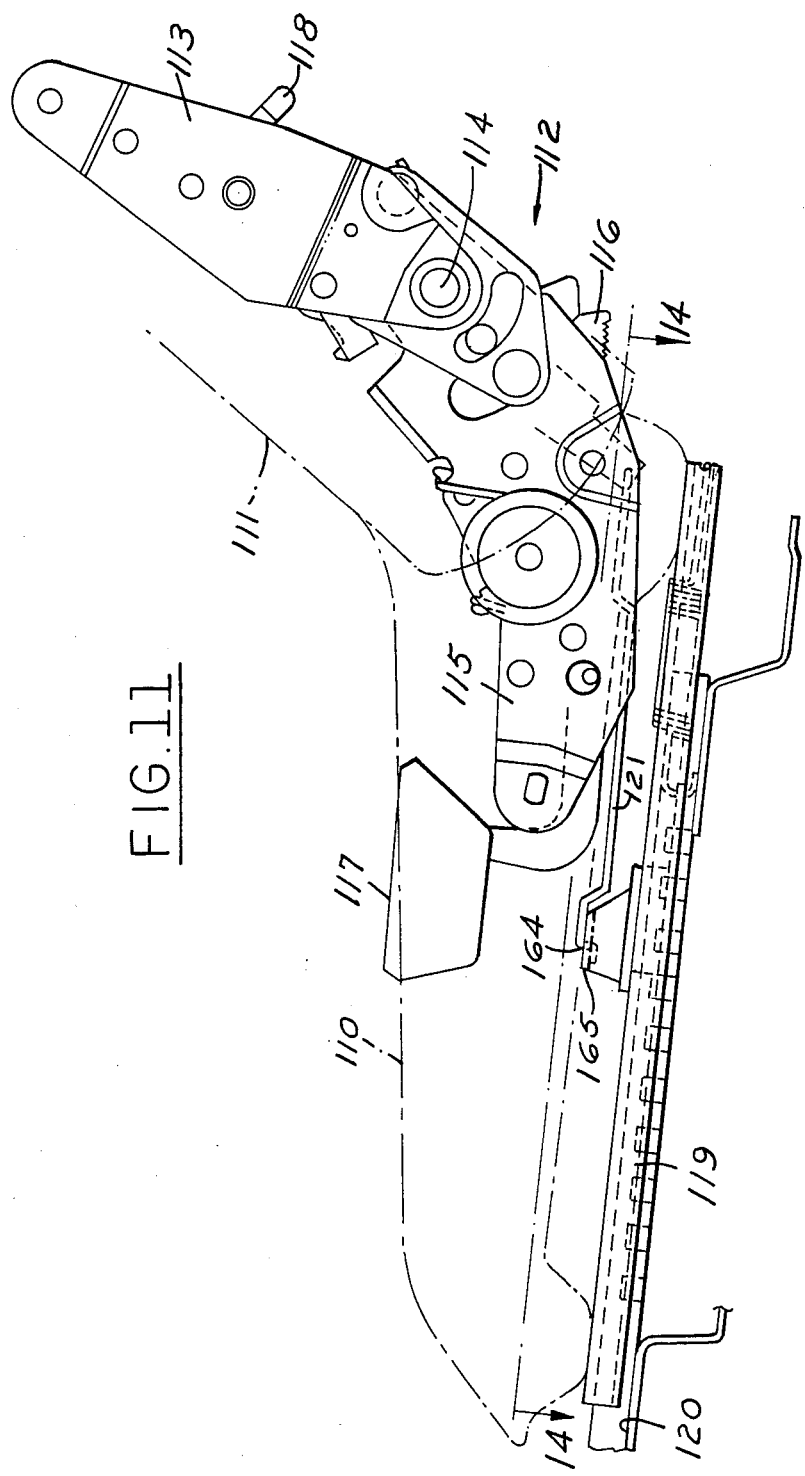

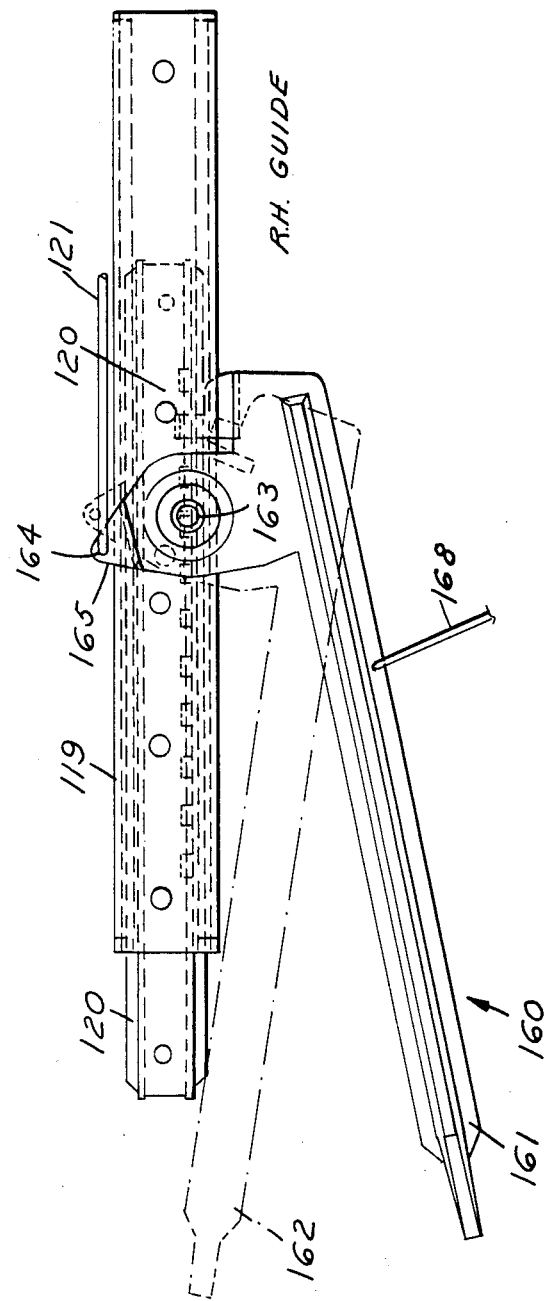

VEHICLE EASY ENTRY SEAT LATCHING MECHANISM

This application is a continuation-in-part of a co-pending application of one of the joint inventors Ser. No. 638,311 filed on Aug. 6, 1984.

The invention relates to an adjustable seat assembly for an automotive vehicle, and more particularly to a novel latching mechanism for a seat back inertia latch system providing easy entry of passengers to the rear seat area of the vehicle.

BACKGROUND OF THE INVENTION

In two-door passenger cars back seat passengers are inconvenienced in entering and leaving the vehicle, particularly on the passenger side, when the seat is in a back or intermediate position limiting passage, even when the seat back is tipped forward. The desirability of the individual front seat on the passenger side being in a full forward position to facilitate entrance and exit of the rear passenger has been recognized and various mechanical systems to accommodate this objective have been patented, such as disclosed, for example, in U.S. Pat. Nos. 3,931,995, 4,143,911, 4,159,147 and 4,440,442.

In the first of such references a latch release blade is provided with a bellcrank detent both mounted on an upper channel of fore and aft adjuster. A lever and link mechanism shifts, upon tilting the back forward, the latch release blade until locked by the detent to release the upper channel for forward movement along a lower channel. A detent release assembly is mounted on the lower channel to shift the detent to unlock the latch release blade.

In the second, the front seat is moved toward the front of the vehicle by tilting the seat back forward. On completion of entering or leaving the front seat is moved backward after returning the seat back to an upright position. Then the seat walk-in device automatically locks the front seat in a predetermined position.

In the third prior art reference, a latch releasing mechanism is pivotally mounted on a carrier member and moved to a predetermined release position when the back cushion is tilted, and a detent for the latch release blade is actuated by manually operable lever.

In each of such prior art devices the seat back is restored to upright position without reestablishing latch engagement for the seat and rearward movement of the seat a predetermined distance is employed to release a detent or the like to permit latch reengagement for the seat position.

The U.S. Patent to Drouillard et al discloses a seat position control mechanism with an inboard slave track and outboard control track arrangement having a pair of the same track assemblies arranged in vertically stacked relationship. One of the outboard track assemblies provides for horizontal adjustment of the seat and the other provides for movement of the seat to and from an easy entry position. A control cable arrangement interconnects a tilting seat back and latch mechanism for the other outboard track assembly to release a latch mechanism and permit movement of the seat to the easy entry position.

The seat position control mechanism of said co-pending application provides an easy entry vehicle seat arrangement having a dual acting seat back latch mechanism incorporating both horizontal seat cushion track adjustment and resilient forwardly locked positioning of the seat back to an easy entry position. The seat assembly is adjusted for easy entry by initially manually pivoting the upright seat back forwardly toward a tilted and latched position. The initial forward tilting movement of a seat back self-actuating resilient latch mechanism unlatches the seat track. Subsequent tilting of the seat back causes the latch mechanism to lock the seat back in a forward tilted position. The seat assembly is thus free for horizontal movement in a forward direction on the unlocked track for easy entry with the seat back held in its forwardly tilted locked position.

To return the seat assembly to a selected horizontal position the operator slides the tilted seat back and seat cushion assembly rearwardly on the unlocked track. When the rearward sliding effort on the seat exceeds the seat back latch spring bias, the seat back unlocks allowing the operator to return the seat back to its upright position. The unlocking of the seat back causes the track latching assembly to relock the track. Thus, by selecting the point during the rearward travel of the seat cushion at which the seat back is returned to its upright position the operator selects the horizontal location of the seat cushion. With the seat back in its upright position the operator may also use the track control handle to horizontally adjust the seat cushion in a conventional manner.

It is thus a feature of the co-pending application to provide the improved vehicle seat assembly described above having a dual self-actuating latch mechanism which permits easy rear seat entry by an operator pivoting the upright seat back to a forwardly tilted and latched position thereby initially unlocking the seat cushion track and subsequently locking the seat back in a forward tilted mode enabling the seat to be moved to an easy entry position.

A further object of the co-pending application is to provide an easy entry seat latch mechanism wherein the seat cushion can only be occupied by a passenger with the seat cushion horizontal adjustment track latched and the seat back in its normal upright position.

It is still another object of the co-pending application to allow either an operator standing outside the vehicle or a rear seat passenger to readily control the horizontal adjustment of the seat cushion by varing the position at which the operator exerts a force on the forwardly latched seat back when returning the seat assembly to a selected horizontal position.

SUMMARY OF THE PRESENT INVENTION

In the development of a commercial embodiment employing the principles disclosed in said prior application a number of improvements were introduced which are disclosed in the present application including final linkage configurations, new latch friction angle analysis, new method and configuration of tension spring for the latch, new concept of pivoting latch back, new configuration for the latch elements and added supports for stabilizing pivoted latch and lever elements to insure against malfunctioning; and a new "anti-chucking" feature.

In a further final commercial embodiment, the latch hook for retaining the seat back forwardly toward a tilted and latch position is omitted with weight of the seat back in a forward tilted position and pivot friction relied upon for retaining the seat latch in an unlocked condition during rearward sliding of the seat by the operator to a position where the seat back may be returned to its upright position. A favorable angle for a striker fixed to the seat back for unlatching the seat track coordinated with resilient resistance of the "anti-chucking" feature provides for a smooth uniform manual effort in moving the seat back forward to the seat unlocked position.

These and other objects, features and advantages of the invention will be apparent from the accompanying drawings and the detailed description of the preferred embodiments of the invention.

BRIEF DESCRIPTION OF THE DRAWINGS, CO-PENDING APPLICATION

FIG. 1 is a perspective view of an automotive seat assembly embodying the easy entry seat back latch arrangements of the invention;

FIG. 2 is a perspective view of the vehicle seat latching mechanism of FIG. 1;

FIG. 3 is an enlarged elevational view of the seat back latch of FIG. 2 shown unlatched and with the seat back in the normal upright position;

FIG. 3A is a fragmentary view of the seat back latch of FIG. 3 in its intermediate position;

FIG. 4 is a view similar to FIG. 3 with the seat back latch shown latched and with the seat back tilted forward;

FIG. 5 is a partial perspective view of the carrier latch portion of the track latching mechanism in its unlatched mode;

FIG. 6 is a fragmentary end elevational view taken of substantially on the line 6—6 of FIG. 4;

FIG. 7 is a partially schematic side elevational view of the seat assembly of FIG. 1 shown in its normal aft position with the seat back pivoted forward from its dashed-line normal position to its latched tilted position;

FIG. 8 is a view similar to FIG. 7 showing the seat assembly moved forward to its track unlocked easy enter position;

FIG. 9 is a view similar to FIG. 7 showing the seat cushion returned to its normal position from its dashed-line forward position with the seat back maintained in its latched tilted mode; and FIG. 10 is a view similar to FIG. 7 showing the seat assembly in its normal track locked position and the seat back returned to its unlatched upright mode with the track relatched.

BRIEF DESCRIPTION OF THE DRAWINGS OF THE PRESENT CIP APPLICATION

Figure 16:
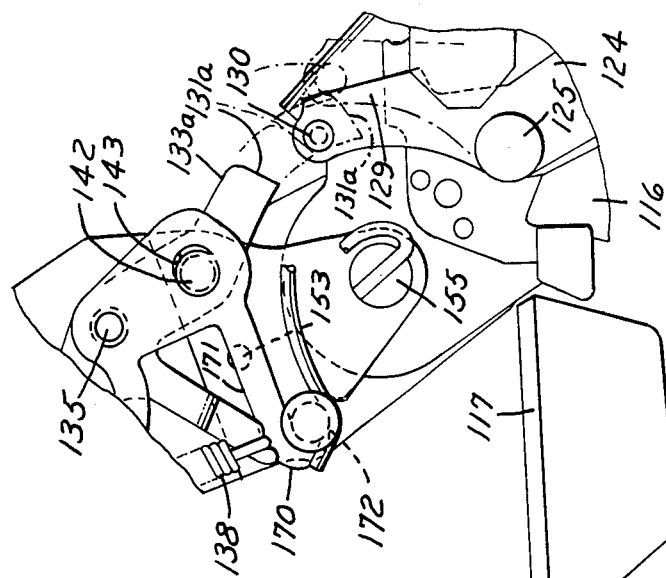
Figure 12:
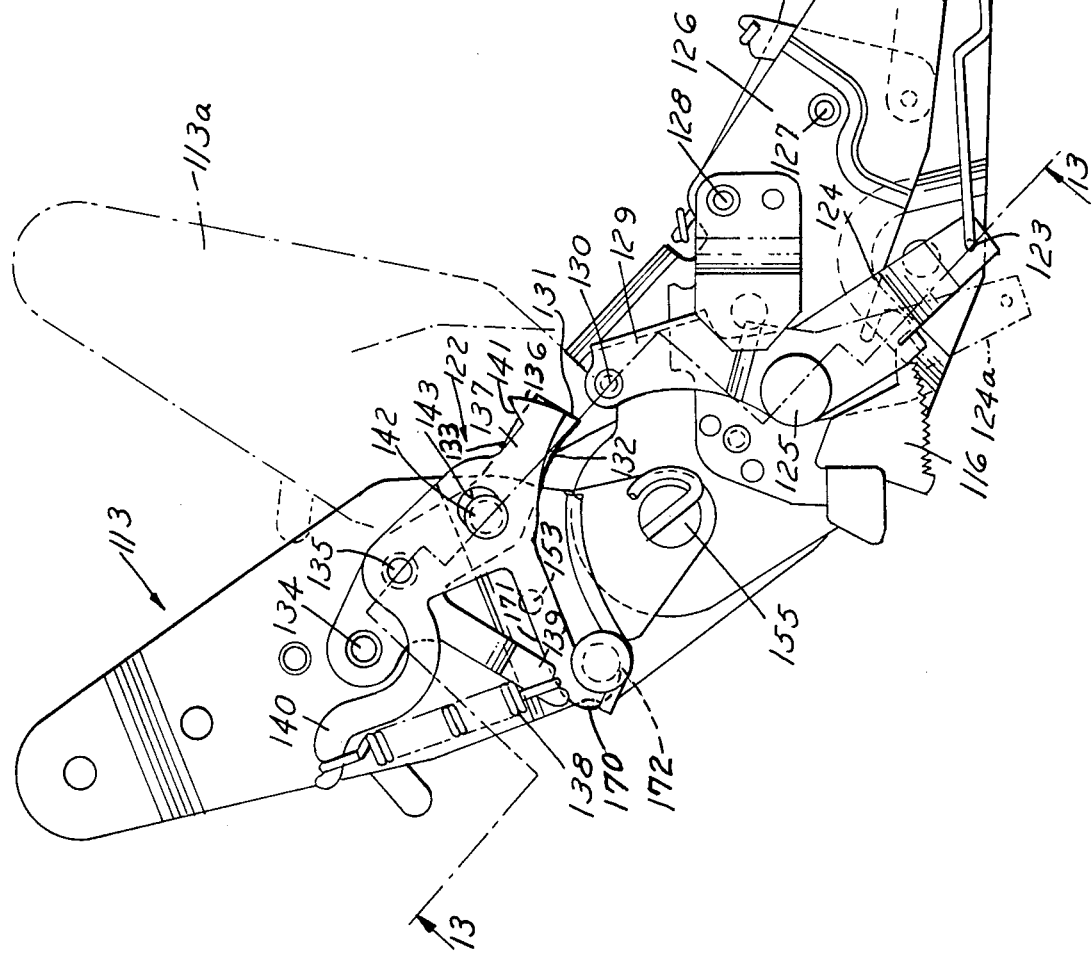
Figure 13:
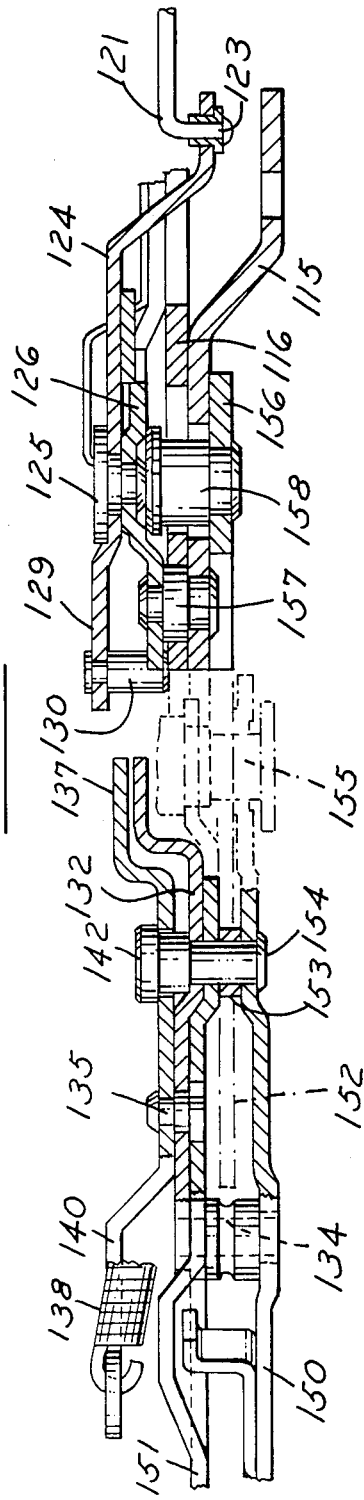
Figure 14:
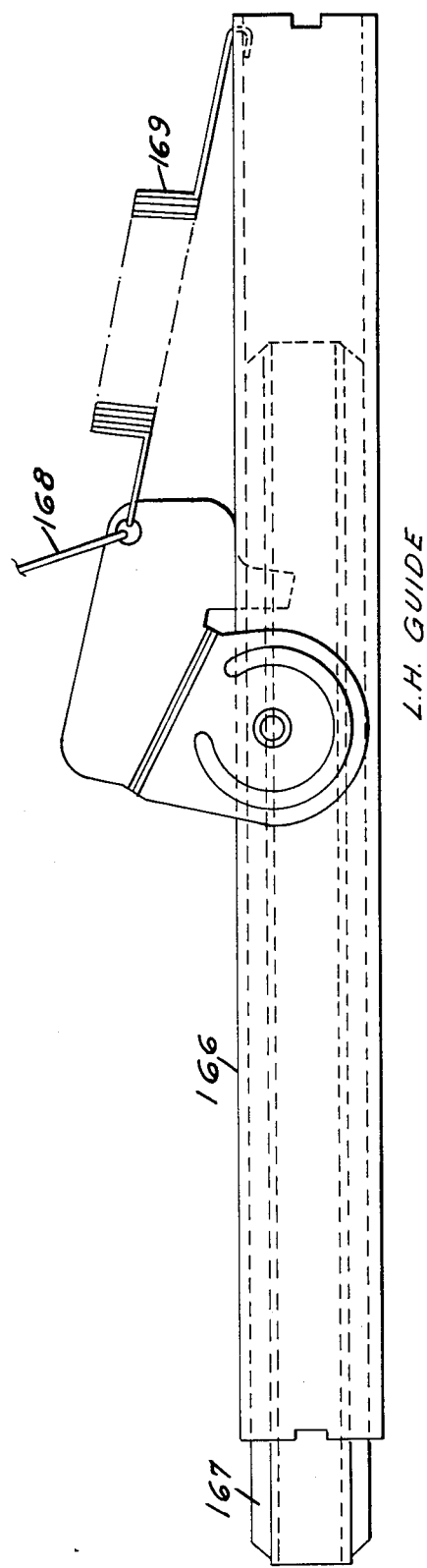

FIG. 11 is a side elevation of a seat back hinge equipped with latch release mechanism of the present invention;

FIG. 12 is an opposite side elevation of the hinge illustrated in FIG. 11;

FIG. 13 is a sectional view taken along the 3—3 of FIG. 12;

FIG. 14 is a sectional plan view of the remote left seat track taken along the line 14—14 of FIG. 11;

FIG. 15 is a plan view of the right seat track directly under the recliner hinge of FIG. 11; and FIG. 16 is a fragmentary view of a portion of the latch mechanism illustrated in FIG. 12 illustrating a modification wherein the seat back latch hook is omitted.

DETAILED DESCRIPTION OF THE CO-PENDING APPLICATION

Referring to FIG. 1 a vehicle seat 10 according to the copending application is shown positioned in the front or forward portion of the passenger compartment of a motor vehicle on the driver's side. Thus, the near side of the seat assembly in FIG. 1 is the outboard side of the vehicle. The vehicle seat 10 comprises a seat cushion 11 secured to the vehicle floor 12, and a seat back 14.

The seat back 14 includes a frame structure, not shown, supporting the spring and fabric portions of the seat. The seat back frame structure provides a sheet metal side hinge member 16. In FIG. 2 the hinge member is shown with an upper arm 18 fixed to the seat back 14 and a lower arm 20 fixed to a metal fitting portion 22 of the seat cushion frame. As seen in FIGS. 3 and 4 the lower end of the upper hinge arm 18 is pinned at 24 to the lower hinge arm 20.

A suitable coiled torsion spring reclining mechanism is generally indicated in phantom outline at 26 in FIG. 2. An example of a typical recliner mechanism is shown in U.S. Pat. No. 4,337,978, and reference may be had to that patent for an explanation thereof. The hinge member 16 may also include an inertia latch system that permits free movement of the seat back 14 while preventing its forward movement when a predetermined relative acceleration occurs. As the inertia latch mechanism forms no part of the present invention it has been deleted from the drawings for the purpose of clarity. An example of one type of inertia latch system suitable for use with the present invention is shown in U.S. Pat. No. 4,358,155 issued Nov. 9, 1982 to Osterhold et al.

A similar hinge member (not shown) is provided at the inboard side of the seat back 14. The hinge arms 18 and 20 coact to mount the seat back 14 for pivotal movement relative to the seat cushion 11. The seat back pivots about a generally horizontal axis of the hinge pin 24 between the upright seating position of FIGS. 1, 2 and 3 and the forwardly tilted and latched position of FIG. 4.

Seat 10 is supported on the vehicle for movement to a plurality of horizontally adjusted positions by a conventional track mechanism 28 which includes an upper track member 30 and a lower track member 32. The seat cushion 10 is connected to the upper C-sectioned track member 30 and is slidable on the lower Usectioned track member 32. Track member 32 is mounted on the vehicle floor 12 by fore and aft brackets 34 and 36, respectively. The upper track 30 has a latch member 37 pivotally mounted on the top thereof by means of a vertically extending pivot pin 38 located in latch plate 39 and track member 30. A manually operable control means in the form of a track lever 40, having a handle portion 42, is fixedly attached to latch plate offset portion 44 (FIG. 5) by rivets 45. The latch offset portion 44 has a locking tab 46 extending laterally therefrom.

Upon manual rotation of the track lever 40 latch member 37 pivots about the pivot pin 38 in a counter-clockwise direction indicated by the arrow 47 in FIG. 2. As a result the tab 46 is released from one of a series of lock openings 48 lanced in side flange 49 of the stationary lower track member 32. A coil tension spring 50 has one hooked end (not shown) connected to the aft end of the upper track member 30 and its other hooked end 51 connected to latch offset portion 44. The spring 50 is operative to urge or bias the lock tab 46 into engagement with one of the lock openings 48.

The latch plate 39 has one end of a pull rod 52 connected thereto by a hook portion 53. The rod 52 extends rearwardly with its aft end 54 connected to the lower portion of a seat actuating lever 55. The actuating lever 55 is pivotally connected to the lower seat arm 20 by pivot pin 56 for pivotal movement about a transverse axis. As seen in FIG. 2 the upper end of the actuating lever 55 has a latch pin 58 extending transversely inboard therefrom parallel to the axis of the pivot pin 56.

FIG. 2 shows the upper hinge arm 18 with a seat back latch mechanism generally indicated at 60. The latch mechanism 60 comprises a hook latch plate 62 and a striker plate 64 mounted in flush relationship. The striker plate 64 is fixedly secured to the upper hinge arm 18 by a fastener 66 and a transverse pivot pin 68. The latch plate 62 is supported by pivot pin 68 for pivotal movement thereon relative to the striker plate 64.

As best seen in FIGS. 3, 4 and 6 spring means, in the form of a wire torsion spring 70, urges the latch plate 62 to its spring biased clockwise rotational position. The biasing spring 70 has one end 72 hooked on fastener 66 and its other end formed with an L-shaped bend providing transverse finger portion 74 engaging an arcuate recess 76 in the latch plate 62.

The striker plate forward end has an obtuse angled notch defined by contact surfaces 78 and 80 providing a nose portion 82 with an inclined cam surface 84. The latch plate 62 is located inboard of the actuating lever 55 with the cam surface 84 is oriented rearwardly in spaced relation to the latch pin 58. It will be observed in FIGS. 3 and 6, the inclined cam surface 84 engages the latch pin 58 when the seat back 14 is initially moved forward. Upon the cam surface 84 engaging the latch pin 58 the actuating lever 55 is rotated counterclockwise about pin 56 causing the latch pin 58 to engage arcuate hook portion 86 of the latch plate 62.

As seen in FIG. 3A the latch plate 62 is rotated counterclockwise about pin 68 against the force of biasing spring 70. The camming of the hook portion 86 below the contact surface 80 allows the pin 58 to slide into engagement with the striker plate contact surface 78 as shown in FIG. 4. The seat back is thus latched in a forward tilted mode by virtue of the spring 70 returning the hook portion 86 to its biased position. It will be noted that a stop in 87 is located in latch plate 62 and engages the striker plate 64, as seen in FIG. 3, to limit the biasing position of the latch plate.

The initial forward tilting of the seat back results in counterclockwise pivotal rotation of the actuating lever 55. As a consequence the pullrod 52 pivots the latch plate 39 and unlatches the upper track member 30 from the lower track member 32. Thus, the tilting of the seat back allows the seat 10 to slide forward from its FIG. 7 normal upright position to its FIG. 8 easy entry position with the seat back forwardly latched as shown in FIG. 4.

To return the seat 10 to its seat back upright mode the operator moves the seat back 14 aft causing the seat cushion and its upper track member 30 to slide rearwardly to a selected seating position shown in FIG. 9. When the track sliding effort on the moving seat exceeds the torsion spring 70 biasing force the latch plate 62 rotates counterclockwise about pivot pin 68 unlocking and releasing latch pin 58. The unlocking of the seat back releases tension on the track latch coil spring 50 biasing the track latch member 37 clockwise to relatch the upper and lower track members. With the seat back 14 returned to its upright seating mode of FIG. 10 the operator assumes a seated position. The operator may then use the track lever handle 42 to adjust the seat 10 horizontally fore and aft in a conventional seat adjusting manner.

With reference to FIG. 11 seat 110 is connected to seat back 111 by recliner hinge 112 having seat back bracket 113 pivotally connected at 114 to seat bracket 115. Translation mechanism including toothed sector 116 provides adjustment for seat back angle held by pawl and locking cam under control of release handle 117 in accordance with the disclosure of U.S. Pat. No. 4,223,946 the detailed operation of which is not germane to the present invention and therefore not repeated herein. Seat back bracket 113 can pivot forwardly, subjec to control of an inertia latch responsive to excessive deceleration to prevent such forward tilting beyond 20° from design position and to manual release lever 118 for releasing the inertia latch. A detailed description of the construction and operation of such inertia latch as disclosed in U.S. Pat. No. 4,223,946 again is not germane to the present invention and therefore not repeated herein.

Seat 110 is mounted on conventional adjustable track slides, the left one of which is shown at 119 for movement on floor track 120 subject to conventional manual latch release for longitudinal adjustment of seat position.

DETAILED DESCRIPTION OF NEW EMBODIMENTS

With reference to FIG. 12 forward tilting of seat back 113 beyond 20° and to the dotted line position 113a effects retraction of wire link 121 and release of the seat latch, by mechanism hereinafter described, permitting the seat to move to its full forward position. Seat back bracket 113 is retained in its forward tilted position by back latch 122 during return movement of the seat to its full back position by hand pressure on the seat back whereupon additional manual pressure on the seat back will release back latch 122 permitting seat back bracket 113 to return to its normal position and wire link 121 to return to inoperative position where the seat latch may reengage.

The detailed linkage for accomplishing such sequence of operations will now be described. Wire link 121 is connected at 123 to lever 124 pivotally connected at 125 to plate 126 riveted at 127 and 128 to seat bracket 115. Lateral support for lever 124 is provided by plate 126 on either side of pivot 125 to stabilize its actuation by seat back latch mechanism. Upper end 129 of lever 124 is provided with cylindrical cam latch pin 130 engageable by end 131 of striker back stamping 132 secured at 134 and 135 in fixed relation to bracket 113 whereby forward tilting of bracket 113 beyond 20° will produce pivotal movement of lever 124 to dotted line position 124a actuating wire link 121 to its seat latch release position. At the same time arcuate cam surface 136 will engage pin 130 and, upon encountering limit release travel of wire link 121, displace lever 137 pivotally connected at 135 to bracket 113 against the bias of tension spring 138 anchored at arm extension 139 of stamping 132 and engaging arm extension 140 of lever 137.

The position where cam latch surface 141 will engage pin 130 and retain seat bracket 113 in its tilted position 113a is reached upon initial forward tilting beyond seat latch release and retained until backward force exerted on the seat back overcomes the bias of tension spring 138 permitting return of seat back bracket 113 to its full line position. The strength of tension spring 138 and related arc of latch surface 141 are such as to resist restoration of seat back bracket 113 to its normal position until the seat has fully returned to or close to its rearward position or to an intermediate position resisted by the rear seat passenger.

Arc 136, in order to minimize displacement force, is provided with a suitable radius relative to pivot 135. The pin engaging surface 133 of striker back 132 in seat back latched position is radiused on the center of pivot 155 to prevent any arcuate displacement of lever 124 during disengagement of latch 122, thereby assuring consistency in release effort required to restore seat back bracket 113 to normal position.

In order to avoid lateral displacement of lever 137 under operational stresses, a retaining headed pin 142 overlaps the edges of slotted opening 143 in lever 137. This has been found to be important in life testing the recliner hinge over required cycles of operation.

In order to prevent unoccupied seat back "chucking" or undesired forward tilting under deceleration inertia forces, hook 170 at the end of extension 171 of cam lever 137 engages torque spring reaction pin 172 and is retained under the bias of spring 138 until manual forward pressure on the seat back tips the back and lever 137 extension 171 about pivot 135 extending spring 138 within the clearance of slotted aperture 143 which is sufficient to disengage hook 170.

Referring to FIG. 13 it will be seen that seat back hinge 113 includes sandwich stamping plates 150 and 151 enclosing inertia latch 152, pivoted at 153 as shown in FIG. 12. The plates are connected by shouldered pin 142 with spacer bushing 153 providing clearance for free movement of inertia latch 152 when pin head 154 is riveted over in assembly tightly securing striker back 132 while permitting free pivotal movement of cam lever 137 about pivot 135 within limits of slotted aperture 143, shown in FIG. 12.

Bracket plates 150 and 151 terminate at main pivot 155, shown in phantom in FIG. 13 because bypassed by section line 13—13. Seat bracket 115 also terminates at main pivot 155 in association with intermediate plate 156, toothed sector 116 pivotally connected at 157 to bracket 115, translation drive pin 158, and inter-engaging translation seat back adjustment mechanism for positioning tooth sector 116 as disclosed and described in detail in U.S. Pat. No. 4,223,946. Lever 124 is pivotally connected at 125 to stamping 126 secured by rivets 127 and 128 to seat bracket 115.

From the foregoing description of detailed components in FIGS. 12 and 13, it will be clear that when seat back bracket 113 is tipped forward to position 113a, end surface 131 of striker 132 which is fixed to bracket plate 151 will engage pin 130 actuating lever 124 to dotted line position 124a for retracting wire link 121 and that the limit of articulation of lever 124 will cause pin 130 to actuate arcuate cam surface 136 and become seated on retaining latch surface 141 following displacement of lever 137 against preloaded spring 138; also, that return of seat back hinge 113 from its 113a position to its normal position will also require displacement of lever 137 against the bias of spring 138 designed to require manual effort exceeding the resistance of the seat to its displacement to a full back position.

The operation of wire link 121 to release the standard seat latch may be understood with reference to FIGS. 11, 14, and 15. While side elevation of the seat 110, seat back 111, track slide 119 and track 120 have been shown in FIG. 11 only and omitted in FIG. 12, it will be understood that two standard seat tracks are employed. A plan view of the right side track, as shown in FIG. 15, is positioned underneath the recliner hinge of FIG. 11, and the left side track illustrated in FIG. 14 is laterally spaced from the recliner hinge of FIG. 11 although superimposed in the view to show operating elements of both track slides.

With reference to FIG. 15, a standard seat latch is released by actuation of handle 160 from its normal position shown at 161 to release position at 162 against the bias of a suitable tension spring, not shown. Seat back release of the standard seat slide is effected through wire link 121 connected at 164 to lever extension 165.

With reference to FIG. 14 simultaneous release of left hand slide 166 from track 167 is effected by transverse wire link 168, against the bias of tension spring 169, responsive to either conventional manual actuation of lever 160 or seat back actuation by wire 121.

With reference to FIG. 16 a final commercial embodiment dispenses with the lower end of lever 137, including hook surfaces 136, 141, relying on striker 131a and pin engaging surface 133a to actuate upper end 129 of lever 124 through engagement of pin 130 and to retain the lever in seat release position until the seat back is returned to upright position. This modification reflects an experimental determination that the weight of the seat back alone in forward tilted position together with conventional pivot friction is sufficient to accommodate manual return of the seat without the need for retaining hook surface 141 and the final manual force to restore the seat back to its upright position is conveniently reduced.

The profile of striker 131a has been revised to include a new 16° slope relative to a radial line from pivot 155 to the lower end point of surface 133a and 0.09" radius corner arcuate transition leading to radius surface 133a which provide smooth seat back folding generation. The remaining structure, including lever 137 with anti-chucking hook 170 at the end of lever extension 171, are retained as in the previous embodiment. The final result minimizes the forward seat back dump load in combination with the anti-chucking feature as well as minimizing the manual seat back return effort for occupant use.

The 16° striker contact surface 131a upon initial engagement with pin 130 thereby forms an angular relationship of approximately 45° with the line connecting the contact point of pin 130 with the center of its pivot at 125. As the seat back progresses from the initial contact shown in broken line in FIG. 16 to the final position shown in broken line, pin 30 will slide up the inclined striker surface 131a and over the radius corner to the retaining surface 133a having a circular arc curvature centered on pivot 155.

From the foregoing description it will be understood, in summary, that the present invention provides an easy entry vehicle seat latch mechanism compatible with conventional inertia latch, recliner, and horizontal seat adjusting systems. A dual function easy entry latch mechanism is provided which initially unlatches a seat horizontal adjuster and subsequently resiliently or otherwise holds the seat back in a forwardly tilted easy entry position. The mechanism allows the front seat to be readily traversed fore and aft either by a person standing outside the vehicle or by a rear seat passenger exiting the vehicle when the front seat is unoccupied.

Resilient means are included to prevent undesired lost motion forward tilting of unoccupied seat back under normal deceleration inertia forces.

We claim:

1. Passenger car individual front passenger seat back actuated seat latch release means comprising pivotally connected seat and seat back bracket means, longitudinal track seat adjustment means including manual latch release means, pivoted lever means on said seat bracket means, striker means fixed on said seat back bracket means responsive to forward tilting for actuating said lever means, linkage means from said lever means for actuating said manual latch release means, said striker means including a surface for retaining said lever means in latch release mode during manual return of the seat to rearward position and seat back to upright position.

2. Latch release means of claim 1 including front passenger seat back restrained from forward tilting by inertia latch, with spring loaded arm means engaging a fixed element on said seat bracket means for resisting "chucking" and initial forward seat back tilting until a predetermined manual forward tilting force is applied.

3. Latch release means of claim 1 wherein said lever means has a projection engaged by said striker means surface, and said striker means surface is provided with a radius centered on the pivotal connection between said seat bracket and seat back bracket means.

4. Latch release means of claim 3 including a striker means profile having a primary lever actuating surface for engaging said projection and an arcuate corner transition leading to said radius surface providing means for smooth seat back folding generation.

5. Latch release means of claim 4 wherein said primary surface extends at approximately a 16° angle relative to a radial line from the center of brackets pivot to the adjacent terminal end of said primary striker surface.

6. Latch release means of claim 5 wherein the contact surface of said projection upon initial engagement by said striker means has an angular relationship with respective bracket and lever means pivot centers of approximately 60° whereby said primary striker surface has an angular relationship of approximately 45° with a line connecting said projection contact surface with the center of said lever means pivot.

7. Passenger car individual front passenger seat back actuated seat latch release means comprising pivotally connected seat and seat back bracket means, longitudinal track seat adjustment means including manual latch release means, pivoted lever means on said seat bracket means, striker means fixed on said seat back bracket means responsive to forward tilting for actuating said lever means, linkage means from said lever means for actuating said manual latch release means in response to said forward tilting, seat back latch means pivotally mounted on said seat back bracket means including resilient means for retaining said lever means in actuated latch release mode pending restoration of said seat back bracket means to normal position, said resilient means having strength adequate to resist manual seat back return during seat movement to its rearward position, a slot in said pivoted seat back latch means between its pivot point and latch engaging surface, and headed pin means anchored on said seat back bracket means extending through said slot for retaining said pivoted seat back latch means against lateral displacement during actuation of said pin and lever means.

8. Latch release means of claim 7 wherein said pivoted seat back latch means includes a spring pre-loaded arm means engaging a fixed element on said seat bracket means for resisting seat back "chucking" and initial forward tilting of seat back from moderate deceleration until manual forward seat back tilting force overcomes the spring pre-load.

9. Latch release means of claim 8 including projection means mounted on the end of said pivoted lever means engaged by said seat back latch means upon forward tilting of said seat back wherein said spring pre-loaded arm means also provides means for resisting seat back latch release from said projection means.

10. Latch release means of claim 9 wherein said striker means is provided with a primary lever actuating surface and a secondary projection engaging surface comprising a circular arc centered on the pivotal axis for said seat back bracket means for retaining said lever means in manual latch release position.

11. Latch release means of claim 10 wherein said primary actuating surface is connected to said secondary surface by a radiused corner.

12. Latch release means of claim 11 wherein said primary surface extends at a 16° angle relative to radial line from the center of the pivotal connection of said bracket means to the adjacent terminal end of said primary striker surface.

13. In a passenger car having pivotally connected seat and seat back brackets with individual front passenger seat back restrained from forward tilting by inertia latch, pre-loaded spring arm means for resisting "chucking" and initial forward seat back tilting until predetermined manual force is applied.

* * * * *